US012580947B2

(12) United States Patent
Boerner

(10) Patent No.: US 12,580,947 B2
(45) Date of Patent: Mar. 17, 2026

(54) BROWSER SECURITY VIA DOCUMENT OBJECT MODEL MANIPULATION

(71) Applicant: Keep Aware, Inc., Austin, TX (US)

(72) Inventor: Ryan Boerner, Austin, TX (US)

(73) Assignee: Keep Aware, Inc., Austin, TX (US)

( * ) Notice: Subject to any disclaimer, the term of this patent is extended or adjusted under 35 U.S.C. 154(b) by 168 days.

(21) Appl. No.: 18/360,597

(22) Filed: Jul. 27, 2023

(65) Prior Publication Data

US 2025/0039227 A1     Jan. 30, 2025

(51) Int. Cl.
*H04L 9/40*                (2022.01)

(52) U.S. Cl.
CPC ...... *H04L 63/1441* (2013.01); *H04L 63/1433* (2013.01)

(58) Field of Classification Search
CPC .......................... H04L 63/1441; H04L 63/1433
USPC .......................................................... 726/23
See application file for complete search history.

(56) References Cited

U.S. PATENT DOCUMENTS

| | | | |
|---|---|---|---|
| 8,448,241 B1 | 5/2013 | Kadakia | |
| 10,404,662 B1 * | 9/2019 | Ben-Dor | H04L 67/53 |
| 12,197,516 B2 * | 1/2025 | Mukherjee | G06F 16/951 |
| 2009/0077565 A1 * | 3/2009 | Frazier | G06F 16/972 |
| | | | 719/311 |
| 2014/0317741 A1 * | 10/2014 | Be'ery | H04L 63/16 |
| | | | 726/23 |

| | | | |
|---|---|---|---|
| 2015/0028131 A1 | 1/2015 | Joseph et al. | |
| 2016/0335232 A1 * | 11/2016 | Born | G06F 21/128 |
| 2017/0025739 A1 | 1/2017 | Caratelli et al. | |
| 2018/0300480 A1 * | 10/2018 | Sawhney | G06F 21/563 |
| 2019/0354709 A1 | 11/2019 | Brinskelle | |
| 2020/0137110 A1 | 4/2020 | Tyler et al. | |
| 2020/0274782 A1 | 8/2020 | Balaiah | |

(Continued)

OTHER PUBLICATIONS

Yang, Jeong Rok, International Preliminary Report on Patentablity, Application No. PCT/US2024/038247, mailed Nov. 5, 2024, 9 pages, pub. by Korean Intellectual Property Office, Daejeon, Korea.

(Continued)

*Primary Examiner* — Teshome Hailu
(74) *Attorney, Agent, or Firm* — Baker Botts L.L.P.

(57)                ABSTRACT

A computer-implemented method executed using a browser extension that is associated with a web browser of a client computer, the method comprising: detecting that the web browser of the client computer has initiated loading a web page into computer memory of the client computer; inserting one or more browser-executable scripts into the web page in the computer memory; using the one or more browser-executable scripts, obtaining data on one or more aspects of the web page; sending the data on the one or more aspects of the web page to a second computer for analysis; receiving from the second computer a risk value corresponding to a potential security risk associated with the one or more aspects of the web page; based on the risk value, selecting a corrective action from among a plurality of different corrective actions, wherein each different corrective action in the plurality of different corrective actions corresponds to a different risk value associated with the potential security risk; executing the corrective action by modifying the web page in the computer memory.

20 Claims, 4 Drawing Sheets

(56)        References Cited

U.S. PATENT DOCUMENTS

| | | | | |
|---|---|---|---|---|
| 2020/0311790 A1* | 10/2020 | Keren | ............... | G06Q 20/4016 |
| 2021/0097174 A1* | 4/2021 | Mandal | ................ | G06F 21/554 |
| 2022/0022208 A1 | 1/2022 | Nakamura et al. | | |
| 2022/0217169 A1* | 7/2022 | Varanda | ............. | H04L 63/1433 |
| 2022/0245272 A1 | 8/2022 | Fleck et al. | | |
| 2023/0008412 A1 | 1/2023 | Barhoumeh et al. | | |
| 2023/0129631 A1* | 4/2023 | Khan | ..................... | G06F 21/54 |
| | | | | 726/25 |

OTHER PUBLICATIONS

Chatel, Cecile, International Preliminary Report on Patentablity, Application No. PCT/US2024/038247, mailed Feb. 5, 2026, 6 pages, PCT Ib Form 326, pub. by The International Bureau of WIPO, Geneva Switzerland.

* cited by examiner

Fig. 2

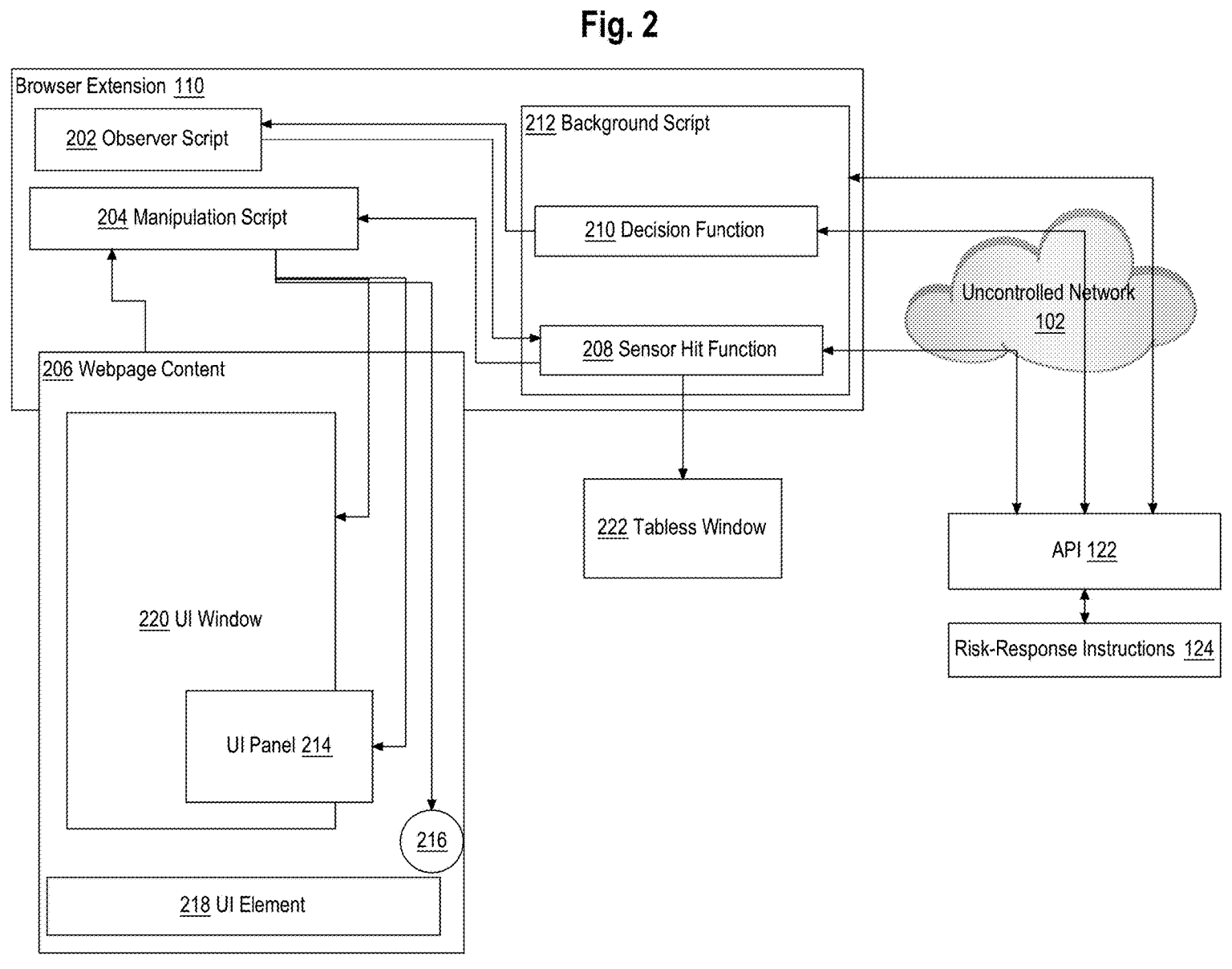

Uncontrolled Network 102

API 122

Risk-Response Instructions 124

212 Background Script

210 Decision Function

208 Sensor Hit Function

222 Tableless Window

Browser Extension 110

202 Observer Script

204 Manipulation Script

206 Webpage Content

220 UI Window

UI Panel 214

216

218 UI Element

BROWSER SECURITY VIA DOCUMENT OBJECT MODEL MANIPULATION

COPYRIGHT NOTICE

TECHNICAL FIELD

One technical field of the present disclosure is computer security, specifically browser security. Another technical field is the automated modification of HTML documents such as web pages by transforming elements of a document object model (DOM) of a web page.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Electronic attacks on computer systems continue to be a serious technical and business problem. While cybersecurity systems have increased in sophistication in recent years, deficiencies still exist. One attack vector that is difficult to prevent occurs when a malicious entity causes the insertion of browser-executable code or other malware into HTML documents, such as web pages, after an HTTP server or web application has generated the web pages and before an end-user or client computer interacts with the web pages. Malicious actors also can create and deploy websites and web pages that contain malicious content but appear legitimate. When this occurs, the end-user may invoke or click on links to other malicious content, or activate code, resulting in information leakage, the installation of spyware or malware on other parts of the client computer or other computers in a local network, or other unauthorized or harmful actions. For business enterprises, preventing unknowing end users from installing malware and/or clicking on malicious links is a serious problem. Because human judgment is involved in deciding what to click on, complete prevention using technical measures has been difficult.

Based on the foregoing, the referenced technical fields have developed an acute need for better ways to secure internet browser software against the introduction of malware. More specifically, a technical solution is needed that can correct or safeguard HTML elements of a webpage, browser-executed code, or other elements in memory before the end user can invoke malicious elements.

SUMMARY

The appended claims may serve as a summary of the invention.

BRIEF DESCRIPTION OF THE DRAWINGS

In the drawings:

FIG. 2 illustrates an example architecture for the principal functional elements of one embodiment, showing logical paths of flows of data.

DETAILED DESCRIPTION

Figure 1:
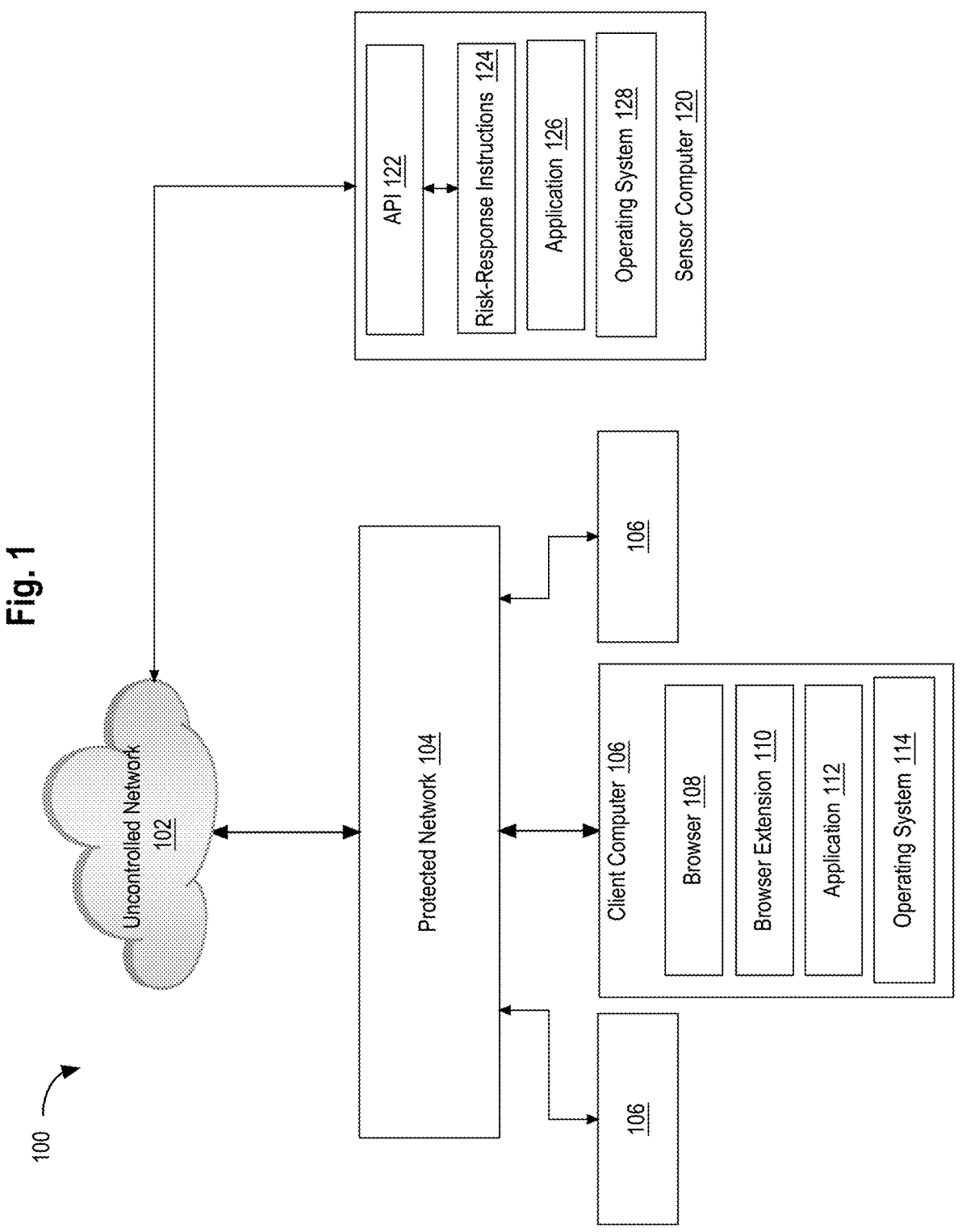
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully.

Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

In one embodiment, a browser extension is programmed to detect that a web browser is loading at least a portion of webpage content, such as a DOM. In response, using in-memory operations, the browser extension inserts an observer script and a manipulation script, or a single script comprising both, into the webpage content as a first script in the content or DOM. The browser extension is programmed to detect that the web browser has completed loading the webpage content and, in response, to cause browser execution of the observer script to obtain data relating to the webpage content. A background script executes asynchronously. A sensor hit function of the background script receives the data relating to the webpage content and calls an API of a sensor computer. Risk-response instructions of the sensor computer calculate a risk value associated with the data relating to the webpage content and return the risk value in a response to the sensor hit function. Depending on the value of the risk value, the sensor hit function calls a manipulation script and specifies a responsive action. The manipulation script writes one or more new HTML elements or script code into the webpage content which, when executed or rendered, cause displaying one or more of a UI panel, widget, UI element, and/or UI window. Additionally, the sensor hit function can instantiate the tab-less window based on the risk value received from the risk-response instructions. In an embodiment, a decision function executes in the background and periodically updates the observer script with metrics to observe in the webpage content.

In various embodiments, the disclosure encompasses the subject matter of the following numbered clauses:

1. A computer-implemented method executed using a browser extension that is associated with a web browser of a client computer, the method comprising: detecting that the web browser of the client computer has initiated loading a web page into computer memory of the client computer; inserting one or more browser-executable scripts into the web page in the computer memory; using the one or more browser-executable scripts, obtaining data on one or more aspects of the web page; sending the data on the one or more aspects of the web page to a second computer for analysis; receiving from the second computer a risk value corresponding to a potential security risk associated with the one or more aspects of the web page; based on the risk value, selecting a corrective action from among a plurality of different corrective actions, wherein each different corrective action in the plurality of different corrective actions corresponds to a different risk value associated with the potential security risk; executing the corrective action by modifying the web page in the computer memory.

2. The computer-implemented method of clause 1, further comprising: asynchronously executing a background script that is separate from the one or more browser-executable scripts; sending from the background script the data on the one or more aspects of the web page to a second computer system for analysis; receiving by the background script the risk value corresponding to the potential security risk associated with the one or more aspects of the web page.

3. The computer-implemented method of clause 1, comprising inserting the one or more browser-executable scripts into the web page in the computer memory as a first script in webpage content to be executed before any other scripts of the webpage content.

4. The computer-implemented method of clause 1, wherein the one or more browser-executable scripts comprise: an observer script that is programmed to read the one or more aspects of the web page; and a manipulation script that is programmed to perform the modifying the web page in the computer memory.

5. The computer-implemented method of clause 1, wherein executing the corrective action by modifying the web page in the computer memory comprises automatically generating and causing rendering one or more of: a pop-up window in a graphical user interface; a widget in the graphical user interface.

6. The computer-implemented method of clause 5, wherein the pop-up window includes one or more clickable action buttons.

7. The computer-implemented method of clause 1, wherein executing the corrective action by modifying the web page in the computer memory comprises blocking loading one or more elements of the web page when the potential security risk is greater than a threshold.

8. The computer-implemented method of clause 7, wherein executing the corrective action by modifying the web page in the computer memory comprises causing displaying a notification that includes an explanation of why the one or more aspects were blocked.

9. The computer-implemented method of clause 1, wherein the one or more aspects include one or more of links across the web page including references and names; specific element classes; a height of the web page; a size of the web page; a number of links; a number of fields in the web page such as password fields, email fields, text fields, or telephone fields; type of action buttons; metadata tags; or scripts to which the web page refers, including references and names.

10. The computer-implemented method of clause 1, wherein executing the corrective action by modifying the web page in the computer memory comprises removing or disabling one or more input fields of the web page that specify entering personally identifiable data.

11. The computer-implemented method of clause 1, wherein executing the corrective action by modifying the web page in the computer memory comprises restricting a user from visiting or interacting with the web page, or blocking the user from visiting or interacting with the web page.

2. Structural & Functional Overview

2.1 Distributed Computer System Example

FIG. 1 illustrates a distributed computer system showing the context of use and principal functional elements with which one embodiment could be implemented. In an embodiment, a computer system 100 comprises components implemented partially by hardware at one or more computing devices, such as one or more hardware processors executing stored program instructions stored in one or more memories for performing the functions described herein. In other words, all functions described herein are intended to indicate operations performed using programming in a special or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of automated browser security In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In an embodiment, computer system 100 can conduct networked digital data telecommunications using an uncontrolled network 102, a protected network 104 coupled to the uncontrolled network, one or more client computers 106, and a sensor computer 120. In an embodiment, the uncontrolled network 102 can comprise an open public internetwork, such as the aggregation of networks and internetworks commonly termed the Internet. In other embodiments, the uncontrolled network 102 can be non-public or proprietary, but untrusted.

Protected network 104 can comprise one or more local area networks, wide area networks, campus networks, or internetworks to which one or more client computers 106 are coupled. A protected network 104 includes networked computers that are the subject of the protective measures described in other sections of this disclosure but do not require or imply the presence or use of technical protections in the network. In some embodiments, the protected network 104 is part of the uncontrolled network. The term "protected" denotes that end stations, such as the client computers 106, are the subjects of the protective technologies that are further described in other sections. The protected network 104 also could include local networks of individuals, such as networks of users performing computing activities at home, public places, third-party facilities such as hotels, and so forth.

Each of the client computers 106 comprises a laptop computer, desktop computer, workstation, tablet computer, or other end station or computing device that is capable of hosting and executing a web browser 108. For purposes of illustrating a clear example, FIG. 1 shows three client computers 106, but the number of client computers that are usable in an embodiment is not limited. Thousands to millions of client computers 106 could be supported in various embodiments.

Each of the client computers 106 hosts or executes a web browser 108, browser extension 110, and an operating system 114; a client computer also can host or execute one or more applications 112 other than the browser. Web browser 108 can be any application program that is capable of establishing an HTTP connection via protected network 104 and uncontrolled network 102 to a networked resource, such as a web server, as well as to the sensor computer 120, directly or indirectly via a networking stack of the operating system 114. Web browser 108 can be a commercially available web browser, such as CHROME, EDGE, FIREFOX, SAFARI, and others. Application 112 can be any computer application.

In an embodiment, each client computer 106 hosts and executes the browser extension 110, which can be loaded from an administrator computer or management server that is within the protected network 104, or from sensor computer 120. The installation of the browser extension 110 can be conducted as part of enterprise IT management policy and/or the browser extension can form a part of a standard machine image that an enterprise installs on all client computers 106 that will access the protected network 104. The specific mechanism for obtaining or installing the browser extension 110 is not critical.

The sensor computer 120 can comprise a laptop computer, desktop computer, workstation, server computer, server cluster or processor cluster, or one or more virtual compute instances of a private data center or public virtual computing facility, such as a commercial cloud computing service. In an embodiment, sensor computer 120 broadly represents one or more virtual compute instances and virtual storage instances that have been instantiated or spun up using a commercial cloud computing service such as AMAZON AWS, MICROSOFT AZURE, GOOGLE CLOUD, or functionally similar services. For purposes of illustrating a clear example, FIG. 1 shows one sensor computer 120, but more than one monitor computer can be used in other embodiments.

The sensor computer 120 hosts or executes an application programming interface (API) 122 that is programmed to receive calls from browser extension 110, identify the calls, and programmatically call methods, functions, or services that are implemented using risk-response instructions 124.

Figure 3:
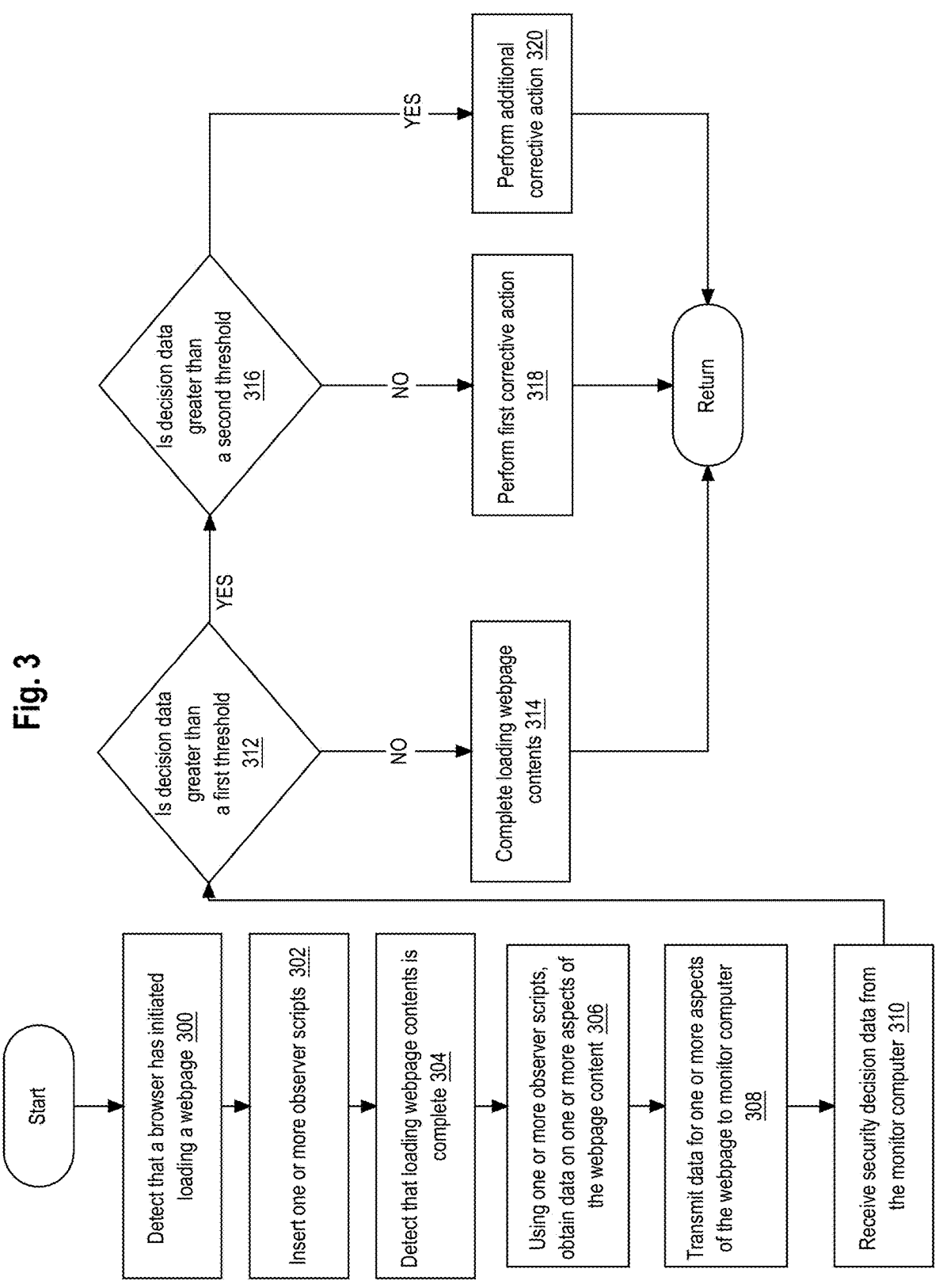
FIG. 3 illustrates an example process for automated browser security via the manipulation of a document object model.

The functions of risk-response instructions 124 are further described herein in connection with FIG. 2, FIG. 3. Sensor computer 120 also hosts or executes one or more applications 126 and an operating system 128.

2.2 Example Process Flows and Data Flows

FIG. 2 illustrates an example architecture for the principal functional elements of one embodiment, showing logical paths of flows of data. Contemporary browsers allow the injection of script code into the document start of each webpage. In an embodiment, the browser extension 110 comprises a set of program instructions that are executable by a client computer 106 and organized as an observer script 202, manipulation script 204, and background script 212. The labels "observer," "manipulation," and "background" are not required in all embodiments, and a particular implementation or embodiment could be functionally equivalent to the operations described herein while using different names or labels.

In an embodiment, as further described in other sections, the observer script 202 is injected into webpage content 206 that the web browser 108 has loaded from a networked resource as part of an HTTP response from the networked resource, and the observer script is programmed to observe the webpage content including all document object model (DOM) elements and browser-executable code in the webpage content. In one embodiment, the observer script 202 is programmed to listen and respond to as many critical events as possible and send information to the background script 212.

In one specific embodiment, the observer script 202 is programmed, in response to a page load operation, new tab operation, or redirection of the web browser 108, or a significant page mutation of the webpage content 206, to inject one or more listener callbacks across the webpage content, as well as to find specific elements and inject one or more listener callbacks into those elements. Listener callbacks constitute small sets of browser executable instructions. Listener callbacks are programmed to transmit event information to the background script 212. Listener callbacks are programmed to collect fields and metadata from the webpage content 206 based on requirements that have been received from the decision function 210. The collection of fields and metadata from the webpage content 206 can execute via a combination of element identifiers, regular expressions or regexes, XPath expression, and direct access to the elements of the DOM tree. One or more of these parameters are retrieved periodically through the decision function 210.

As one example, in response to a page load operation of web browser 108, the observer script 202 is programmed to inject listeners which collect and report values for the then-current domain, URL, page title, metatags, page description, number of header links, number of total links, array of links, array of script names, number of inputs, size of page, and the size of a header. As another example, the observer script 202 is programmed to inject listeners which collect and report values for one or more of links across the page including references and names; specific element classes; a height of the web page; a size of the web page; a number of links; a number of images; type of fields in the web page such as password fields, email fields, text fields, or telephone fields; type of action buttons; metadata tags; or scripts to which the web page refers, including references and names.

As another example, using any combination of the foregoing metadata value, in response to an input at the client computer 106 into a certain field of the webpage contents 206, the observer script 202 is programmed to collect the type of input, the complexity of input, and the name of the input.

As yet another example, in response to an input at the client computer 106 of a file type as part of a file upload operation using the web browser 108, the listeners injected from the observer script 202 are programmed to collect values for the size of the upload, name of upload, domain, and destination folder name. As a further example, in response to input at the user computer specifying a click on a link, the listeners injected from the observer script 202 are programmed to collect values for the link location, link name, location on the page, style of link, and domain.

The manipulation script 204 is programmed to modify the HTML code of the webpage content 206 and/or instantiate and cause displaying one or more of a UI panel 214, widget 216, UI element 218, and/or UI window 220. In an embodiment, the manipulation script 204 can be integrated with the observer script 202; however, the embodiment of FIG. 2 has the benefit of dividing responsibility with the observer script primarily conducting read-like operations and the manipulation script primarily conducting write-like operations.

In an embodiment, the manipulation script 204 is programmed, in response to receiving a message from the background script 212, to execute one or more responsive actions. In an embodiment, executing the sensor hit function 208 causes calls to the manipulation script 204, and the responsive actions of the manipulation script occur based on the responses of the hit function. In one embodiment, the responsive actions comprise injecting user interface elements into the webpage content 206, including but not limited to the DOM of the webpage, to cause displaying a notification or alert to the client computer 106 and/or the user of the computer. Customizable responses and messages can be presented in any of a plurality of different new page elements that are injected into the webpage content 206. A single new page element can be injected, or multiple page elements can be injected. Examples of page elements include larger popups with more details or descriptions, persistent or temporary banners, tooltips, or clickable action buttons. In the example of FIG. 2, the page elements can be programmed to cause visual rendering as one or more of a UI panel 214, widget 216, UI element 218, and/or UI window 220.

Any such element can be injected into the DOM using in-memory insertion operations. The Document Object Model (DOM) is a programming interface for web documents. It represents the page so that programs can change the document structure, style, and content. The DOM represents the document as nodes and objects; that way, programming languages can interact with the page. Thus, the HTML of webpage content 206 represents the initial page content, and the DOM represents the current page content. When script code like JavaScript adds, removes, or edits nodes, the DOM becomes different than the HTML. As an object-oriented representation of the web page, the DOM can be modified with a scripting language such as JavaScript. Browsers offer APIs that script code can call programmatically to modify the DOM. The programmatic mechanics for accessing and changing elements of a DOM are extensively documented in online resources.

In another embodiment, the responsive actions comprise modifying one or more existing page elements to disable, change the appearance, or change the actions associated with the page elements. Examples of responsive actions that can be programmed, in various embodiments, include disabling typing; preventing copy/paste; preventing typing certain sets of characters; preventing a file upload; preventing further page communications or connections; preventing clicks on links; and preventing downloads.

Because the observer script 202 and the manipulation script 204 are injected at the document start of the webpage content 206, being placed as the first script in the webpage content, the observer script and the manipulation script can access the webpage as if the sensor computer 120 had served the webpage, including accessing and interacting with the full DOM tree of the webpage content.

In an embodiment, the background script 212 is programmed to access code persistently across a browser process; the background script can be accessed through a single service worker process across many browser tabs. In one embodiment, the background script 212 is programmed with a sensor hit function 208 and a decision function 210. The sensor hit function 208 executes in the background script 212 and is programmed to retrieve and further parse information from the messages sent from the observer script 202. In an embodiment, the sensor hit function 208 is programmed to call the sensor API to retrieve risk results and a corresponding action recommendation. The function is programmed to send messages that the manipulation script 204 can consume or listen to. A call to the sensor hit function 208 represents an individual activity. In an embodiment, responses from the sensor hit function 208 cause the manipulation script 204 to modify the HTML code of the webpage content 206 and/or instantiate and cause displaying one or more of a UI panel 214, widget 216, UI element 218, and/or UI window 220.

In an embodiment, the background script 212 further comprises a decision function 210, which is called according to a schedule, and allows the sensor computer 120 to retrieve timely information about the metadata that it should retrieve and parse from hits or interactions. The decision function 210 can be implemented as a decision factors endpoint labeled/factors in the implementation code. In an embodiment, the decision factors endpoint instructs the sensor computer 120 which fields and elements to read from webpage content 206 for a specific activity. TABLE 1 illustrates an example of code to pull two values for a single page visit.

TABLE 1

DECISION FACTORS ENDPOINT
CODE EXAMPLE RESPONSE:

```
1    GET /factors
2    {
3
4        selectors: {
5          page: [
6            fields: [
7              {
8                name: "count",
9                returnType: "count"
10               method: "xpath",
11               selector: "//input[@type='text' or @type='email'
or @type='password']"
12             },
13             {
14               name: "password",
15               returnType: "boolean",
16               method: "query",
17               selector: "input[type*='password' i]"
18             }
```

TABLE 1-continued

DECISION FACTORS ENDPOINT
CODE EXAMPLE RESPONSE:

```
19               ],
20             [ ]
21           ],
22
23      //
24
25      [ACTIVITY TYPE]: [
26      [FIELD KEY NAME]: [
27        {
28          name: [FIELD KEY NAME],
29          // Field Name: (dom.fields.password)
30          returnType: [VALUE TYPE]
31          // Return Type: count, number, boolean, string, array,
length, etc.
32          method: [SELECTOR METHOD]
33          // Type: xpath, query, tag, id, class, rgx
34          selector: [SELECTOR]
35          // Expression: xpath, selector query, tag name, id, or
          class name
36        }
37      ]
38    ]
39    //
40    //
```

Example values sensor may compute as a result of these decision factors: dom.fields.count=4; dom.fields.password=true.

The hit response endpoint has a dynamic body and result depending on the selectors and patterns being used on the tenant. It is responsible for making real-time action decisions for any given activity. TABLE 2 presents an example of code that can be used to implement the hit response endpoint.

TABLE 2

HIT RESPONSE ENDPOINT REQUEST
CODE EXAMPLE REQUEST:

```
1    POST /
2    {
3        type: "page",
4        bypass: false,
5        dom: {
6          fields: {
7            count: 4,
8            password: true
9          }
10         hlinks: 12,
11         head_size: 196743,
12         images: 134,
13         desc: "Simple Scheduling",
14         alinks: 45,
15         hDiff: 0,
16         metas: 7,
17         link_spine: 0.711,
18         ...
19       }
20       p: "Canceled Meetings | Calendly",
21       session: "Ens-94gBol78klJdiz49",
22       tab: 65653171,
23       fqdn: "aHR0cHM6Ly9tYWlsLmdvb2dsZS5jb2 ..." // full URL
       for the activity
```

The hit response endpoint responds with a list of patterns that can be used by the sensor for the tab/page and sometimes further activities taking place on the page (pre-caching responses). For individual activities such as input, login, etc., the 'action' key is the only used key in the response (typically the only key in the response). Page visits can have additionally added "elements" that are embedded for future activities on the page that may or may not call the API separately. TABLE 3 presents an example.

TABLE 3

HIT RESPONSE ENDPOINT EXAMPLE
OF RESPONSE RESPONSE:

```
1     {
2            action: {
3                    header: "Security Notice",
4                    loc: "doc-viewer.com",
5                    message: "This site is completely blocked in
                     the org.",
6                    lDesc: [ //Concerns
7                        "Concern: This page does not have ..."
8            ],
9            rDesc: [ // Suggestions
10                   "Suggestion: Verify the Page name correlates
                     to the URL above.",
11                   "Confirm that the above destination is required
for Business Activity."
12                   "If you think this might be suspicious, report
                     the website."
13           ],
14     }
15
16           notes: [ // Details
17               "-This location has been visited 20009 times in the
                 organization."
18           ]
19
20           // Place UI Elements on the Page
21           elements: [
22               {
23                   trigger: "none",
24                   interface: {
25                       placement: "absolute"
26                       [XPOS, YPOS],
27                       message: "Be careful on this page"
28                   }
29               }
30               {
31                   trigger: "input",
32                   selector: {
33                       method: "query",
34                       selector: "input[type*='password' i]"
35                   }
36                   interface: {
37                       placement: "relative"
38                       [XPOS, YPOS] ,
39                       message: "Do not type passwords into
                         unfamiliar sites"
40                   }
41               }
42           ]
43
44
45     }
```

In an embodiment, the browser extension 110, alone or in conjunction with the sensor computer 120, is programmed to create a tab-less window 222, which appears in the client computer 106 as a separate process or pop-up. A direct call from the sensor hit function 208 can instantiate and cause displaying the tab-less window 222.

2.2 Example Data Processing Flows

FIG. 3 illustrates an example process for automated browser security via the manipulation of a document object model. FIG. 3 and each other flow diagram herein are intended as an illustration of the functional level at which skilled persons, in the art to which this disclosure pertains, communicate with one another to describe and implement a computer-implemented method, as described further herein and/or algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In an embodiment, a programmed process as shown in FIG. 3 is invoked, called, or otherwise started, and at block 300, the process comprises detecting that a browser has initiated loading a webpage. Block 300 can constitute detecting action of the browser to establish an HTTP connection to a networked server, request a webpage such as via an HTTP GET request, receive HTML code for the webpage in an HTTP response, and to begin parsing the HTML as part of rendering the webpage. In one embodiment, prior to executing FIG. 3, the browser extension 110 is programmed to subscribe or listen to one or more system events that the operating system 114 or web browser 108 publish, where the system events signal that loading a webpage and/or DOM has initiated or completed. The specific name of the one or more system events will vary depending on the web browser 108, and the browser extension 110 can be programmed to determine the brand or type of the browser and subscribe to the correct event based on the brand or type. For example, in response to detecting that the web browser 108 is FIRE-FOX, the browser extension 110 can be programmed to subscribe to DOMContentLoaded, which is fired as soon as the page DOM has been loaded, without waiting for resources to finish loading. For other browsers, "onload" is a commonly supported event that could be used.

The web browser 108 will load HTML code for a webpage into the main memory of the client computer 106 as part of initiating loading the DOM or webpage content. In an embodiment, in response, at block 302, the process of FIG. 3 is programmed to insert one or more observer scripts into the HTML code in the memory of the client computer. Thereafter, at block 304, the process is programmed to detect that loading the webpage contents is complete; block 304 can be implemented by programming the browser extension 110 to subscribe or listen to a load completion event. The completion of loading typically includes rendering the webpage and retrieving, as specified in the HTML code, external resources such as images and/or other browser-executable code.

At block 306, the process is programmed to use the one or more observer scripts to obtain data on one or more aspects of the webpage content. The observer script(s) can be programmed to collect one or more of the metrics relating to a webpage that have been described previously in relation to FIG. 2. At block 308, the process is programmed to transmit the data for the one or more aspects of the webpage to the monitor computer. For example, the observer script(s) can be programmed to call an API call or method of the sensor computer 120 and transmit, in parameters of a request represented in the API call, key-value pairs for the data that was collected or obtained from the webpage content.

At block 310, the process is programmed to receive security decision data from the monitor computer. The security decision data represents data or instructions corresponding to a security decision executed at the sensor computer 120 based on the data on one or more aspects of the webpage content that the observer script obtained and transmitted to the monitor computer. A specific algorithm, process, and/or code for executing a security decision based upon specific data is beyond the scope of this disclosure and, for purposes of this disclosure, can be treated as a "black box." That is, for purposes of the present disclosure, the internal operation of the sensor computer 120 to form a security decision is not critical.

In one embodiment, the security decision data corresponds to a risk value that the monitor computer has calculated to represent a relative level of risk of the webpage contents based on the data on one or more aspects of the webpage content that the observer script obtained and transmitted to the monitor computer. The risk value can be a real number having a value between "0" and "1," an integer value within a specified range or scale, an alphabetic label, or other data representing a discrete value of relative risk within a range, scale, or spectrum. At block 312, the process is programmed to test whether the decision data is greater than a first threshold value. If the result of block 312 is FALSE or NO or a functional equivalent thereof, then control transfers to block 314, in which the process is programmed to complete loading the webpage contents.

Alternatively, if the result of block 312 is TRUE or YES or a functional equivalent thereof, the process is programmed to transfer control to block 316, which is programmed to test whether the decision data is greater than a second threshold value. If the result of block 316 is FALSE or NO or a functional equivalent thereof, then control transfers to block 318, in which the process is programmed to perform a first corrective action. The first corrective action can be an action that is appropriate for web pages that represent lower levels of risk or cybersecurity threats. Alternatively, if the result of block 316 is TRUE or YES or a functional equivalent thereof, the process is programmed at block 320 to perform an additional corrective action and/or a different corrective action compared to block 318. The corrective action of block 320 can be an action that is appropriate for webpages that represent higher levels of risk or cybersecurity threats. The corrective actions of block 318, 320 can comprise any of the actions that have been previously described for the manipulation script 204 (FIG. 2). In various embodiments, the corrective actions of block 318, 320 can comprise any of:

modifying the web page in the computer memory comprises automatically generating and causing rendering one or more of a pop-up window in a graphical user interface; a widget in the graphical user interface; and wherein the pop-up window includes one or more clickable action buttons.

blocking loading one or more elements of the web page when the potential security risk is greater than a threshold; and displaying a notification that includes an explanation of why the one or more aspects was blocked.

removing one or more input fields of the web page that specify entering personally identifiable data;

disabling one or more input fields of the web page that specify entering personally identifiable data;

pausing one or more file upload operations;

pausing one or more file download operations;

disabling one or more file upload operations;

disabling one or more file download operations;

restricting a user from visiting or interacting with a web page;

blocking the user from visiting or interacting with the web page.

In the context of FIG. 2, one embodiment of the process of FIG. 3 can execute as follows. The browser extension 110 is programmed to detect that the web browser 108 is loading at least a portion of the webpage content 206, such as the DOM. In response, the browser extension 110 inserts the observer script 202 and the manipulation script 204, or a single script comprising both, into the webpage content 206 as a first script in the content or DOM. The browser extension 110 is programmed to detect that the web browser 108 has completed loading the webpage content 206 and, in response, to cause browser execution of the observer script to obtain data relating to the webpage content 206. The background script 212 executes asynchronously.

The sensor hit function 208 of the background script 212 receives the data relating to the webpage content 206 and calls API 122 of the sensor computer 120. Risk-response instructions 124 of the sensor computer 120 calculate a risk value associated with the data relating to the webpage content 206 and return the risk value in a response to the sensor hit function 208. Depending on the value of the risk value, the sensor hit function 208 calls the manipulation script 204, and specifies a responsive action. The manipulation script 204 writes one or more new HTML elements or script code into the webpage content 206 which, when executed or rendered, cause displaying one or more of the UI panel 214, widget 216, UI element 218, and/or UI window 220. Additionally, the sensor hit function 208 can instantiate the tab-less window 222 based on the risk value received from the risk-response instructions 124. In an embodiment, the decision function 210 executes in the background and periodically updates the observer script 220 with metrics to observe in the webpage content 206.

3. Implementation Example—Hardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
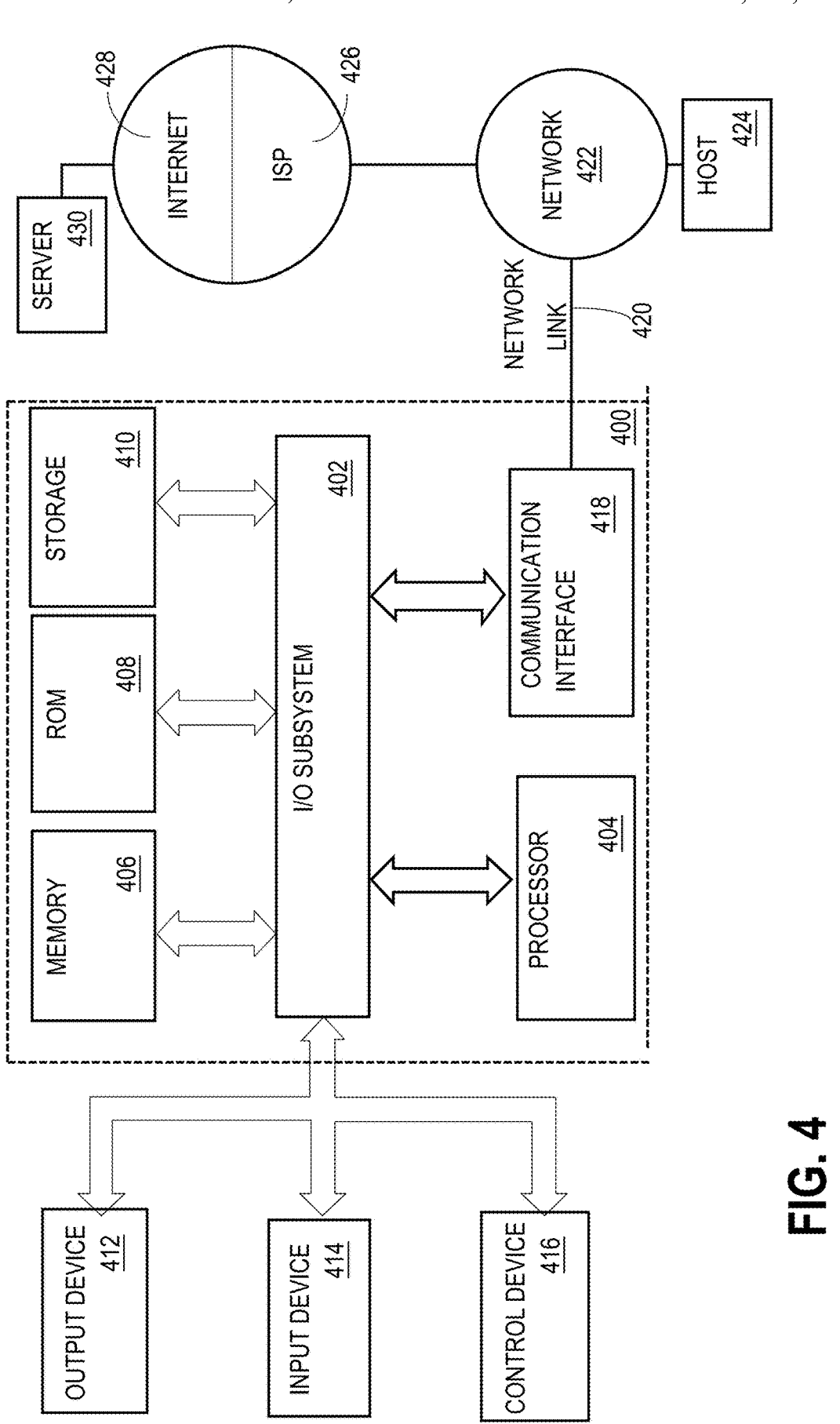
FIG. 4 illustrates a computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 400 includes an input/output (I/O) subsystem 402, which may include a bus and/or other communication mechanism(s) for communicating information and/or instructions between the components of the computer system 400 over electronic signal paths. The I/O subsystem 402 may include an I/O controller, a memory controller, and at least one I/O port. The electronic signal paths are represented schematically in the drawings, such as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU), or a digital signal processor or ARM processor. Processor 404 may comprise an integrated arithmetic logic unit (ALU) or be coupled to a separate ALU.

Computer system 400 includes one or more units of memory 406, such as a main memory, coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during the execution of instructions to be executed by processor 404. Such instructions, when stored in non-transitory computer-readable storage media accessible to processor 404, can render computer system 400 into a special-purpose machine customized to perform the operations specified in the instructions.

Computer system 400 includes non-volatile memory such as read-only memory or ROM 408 or other static storage devices coupled to I/O subsystem 402 for storing information and instructions for processor 404. The ROM 408 may include various forms of programmable ROM (PROM), such as erasable PROM (EPROM) or electrically erasable PROM (EEPROM). A unit of persistent storage 410 may include various forms of non-volatile RAM (NVRAM), such as FLASH memory, solid-state storage, magnetic disk, or optical disks such as CD-ROM or DVD-ROM and may be coupled to I/O subsystem 402 for storing information and instructions. Storage 410 is an example of a non-transitory computer-readable medium that may be used to store instructions and data which, when executed by the processor 404, cause performing computer-implemented methods to execute the techniques herein.

The instructions in memory 406, ROM 408, or storage 410 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer such as a relational database system using a structured query language (SQL) or no SQL, an object store, a graph database, a flat file system, or other data storage.

Computer system 400 may be coupled via I/O subsystem 402 to at least one output device 412. In one embodiment, output device 412 is a digital computer display. Examples of a display that may be used in various embodiments include a touchscreen display, a light-emitting diode (LED) display, a liquid crystal display (LCD), or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections, or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. The control device 416 may be a touchpad, a mouse, a trackball, or cursor direction keys for communicating direction information and command selections to processor 404 and for controlling cursor movement on an output device 412, such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other control device. An input device 414 may include a combination of multiple input devices, such as a video camera and a depth sensor.

In another embodiment, computer system 400 may comprise an Internet of Things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders, and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware, and interfaces for generating position reporting packets, notifications, pulse or heartbeat signals, or other recurring data transmissions that specify a position of the computer system 400, alone or in combination with other application-specific data, directed toward host computer 424 or server computer 430.

Computer system 400 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media." as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 402. Transmission media can also be acoustic or light waves generated during radio-wave and infrared data communications.

Various forms of media may carry at least one sequence of at least one instruction to processor 404 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which hardware processor 404 retrieves and executes the instructions. The instructions received by memory 406 may optionally be stored on storage 410 either before or after execution by processor 404.

Computer system 400 also includes a communication interface 418 coupled to a bus or I/O subsystem 502. Communication interface 418 provides a two-way data communication coupling to a network link(s) 420 directly or indirectly connected to at least one communication network, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 422 broadly represents a local area network (LAN), wide-area network (WAN), campus network, internetwork, or any combination thereof. Communication interface 418 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic, or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may connect through network 422 to a host computer 424.

Furthermore, network link 420 may connect through network 422 or to other computing devices via internetworking devices and/or computers operated by an Internet Service Provider or ISP 426. ISP 426 provides data communication services through a worldwide packet data communication network called Internet 428. A server computer 430 may be coupled to Internet 428. Server computer 430 broadly represents any computer, data center, virtual machine, or virtual computing instance with or without a hypervisor or computer executing a containerized program system such as DOCKER or KUBERNETES. Server computer 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server computer 430 may form elements of a distributed computing system that includes other computers, a processing cluster, a server farm, or other organizations of computers that cooperate to perform tasks or execute applications or services. Server computer 430 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 430 may comprise a web application server that hosts a presentation layer, application layer, and data storage layer, such as a relational database system using a structured query language (SQL) or no SQL, an object store, a graph database, a flat file system or other data storage.

Computer system 400 can send messages and receive data and instructions, including program code, through the network(s), network link 420, and communication interface 418. In the Internet example, server computer 430 might transmit a requested code for an application program through Internet 428, ISP 426, local network 422, and communication interface 418. The received code may be executed by processor 404 as it is received and/or stored in storage 410 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. Accordingly, the specification and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using a browser extension that is associated with a web browser of a client computer, the method comprising:

detecting that the web browser of the client computer has initiated loading a web page into a computer memory of the client computer;

inserting, by the browser extension, one or more browser-executable scripts into the web page in the computer memory as a first script in webpage content to be executed before any other scripts of the webpage content;

using the one or more browser-executable scripts, obtaining data on one or more aspects of the web page by injecting one or more listener callbacks across the webpage content, wherein the data on the one or more aspects comprises metadata and one or more fields collected by the one or more listener callbacks;

sending the data on the one or more aspects of the web page to a second computer for analysis;

receiving from the second computer a risk value corresponding to a potential security risk associated with the one or more aspects of the web page;

based on the risk value, selecting a corrective action from among a plurality of different corrective actions, wherein each different corrective action in the plurality of different corrective actions corresponds to a different risk value associated with the potential security risk; and executing the corrective action by modifying the web page in the computer memory.

2. The computer-implemented method of claim 1, further comprising:

asynchronously executing a background script that is separate from the one or more browser-executable scripts;

sending from the background script the data on the one or more aspects of the web page to a second computer system for analysis;

receiving by the background script the risk value corresponding to the potential security risk associated with the one or more aspects of the web page.

3. The computer-implemented method of claim 1, wherein the one or more browser-executable scripts comprise: an observer script that is programmed to read the one or more aspects of the web page; and a manipulation script that is programmed to perform the modifying the web page in the computer memory.

4. The computer-implemented method of claim 1, wherein executing the corrective action by modifying the web page in the computer memory comprises automatically generating and causing rendering one or more of: a pop-up window in a graphical user interface; a widget in the graphical user interface.

5. The computer-implemented method of claim 4, wherein the pop-up window includes one or more clickable action buttons.

6. The computer-implemented method of claim 1, wherein executing the corrective action by modifying the web page in the computer memory comprises blocking loading one or more elements of the web page when the potential security risk is greater than a threshold.

7. The computer-implemented method of claim 6, wherein executing the corrective action by modifying the web page in the computer memory comprises causing displaying a notification that includes an explanation of why the one or more aspects was blocked.

8. The computer-implemented method of claim 1, wherein the one or more aspects include one or more of links across the web page including references and names; specific element classes; a height of the web page; a size of the web page; a number of links; a number of images; type of fields in the web page such as password fields, email fields, text fields, or telephone fields; type of action buttons; metadata tags; or scripts to which the web page refers, including references and names.

9. The computer-implemented method of claim 1, wherein executing the corrective action by modifying the web page in the computer memory comprises at least one of:

removing one or more input fields of the web page that specify entering personally identifiable data;

disabling one or more input fields of the web page that specify entering personally identifiable data;

pausing one or more file upload operations;

pausing one or more file download operations;

disabling one or more file upload operations; or disabling one or more file download operations.

10. The computer-implemented method of claim 1, wherein executing the corrective action by modifying the web page in the computer memory comprises restricting a user from visiting or interacting with the web page, or blocking the user from visiting or interacting with the web page.

11. One or more non-transitory computer-readable storage media storing one or more sequences of program instructions which, when executed using one or more processors, cause the one or more processors to execute:

detecting that a web browser of a client computer has initiated loading a web page into computer memory of the client computer;

inserting by a browser extension associated with the web browser, one or more browser-executable scripts into the web page in the computer memory as a first script in webpage content to be executed before any other scripts of the webpage content;

using the one or more browser-executable scripts, obtaining data on one or more aspects of the web page by injecting one or more listener callbacks across the webpage content, wherein the data on the one or more aspects comprises metadata and one or more fields collected by the one or more listener callbacks;

sending the data on the one or more aspects of the web page to a second computer for analysis;

receiving from the second computer a risk value corresponding to a potential security risk associated with the one or more aspects of the web page;

based on the risk value, selecting a corrective action from among a plurality of different corrective actions, wherein each different corrective action in the plurality of different corrective actions corresponds to a different risk value associated with the potential security risk; and executing the corrective action by modifying the web page in the computer memory.

12. The one or more non-transitory computer-readable storage media of claim 11, further comprising sequences of program instructions which, when executed using the one or more processors, cause the one or more processors to execute:

asynchronously executing a background script that is separate from the one or more browser-executable scripts;

sending from the background script the data on the one or more aspects of the web page to a second computer system for analysis;

receiving by the background script the risk value corresponding to the potential security risk associated with the one or more aspects of the web page.

13. The one or more non-transitory computer-readable storage media of claim 11, wherein the one or more browser-executable scripts comprise: an observer script that is programmed to read the one or more aspects of the web page; and a manipulation script that is programmed to perform the modifying the web page in the computer memory.

14. The one or more non-transitory computer-readable storage media of claim 11, further comprising sequences of program instructions which, when executed using the one or more processors, cause the one or more processors to execute the corrective action by modifying the web page in the computer memory comprises automatically generating and causing rendering one or more of: a pop-up window in a graphical user interface; a widget in the graphical user interface.

15. The one or more non-transitory computer-readable storage media of claim 14, wherein the pop-up window includes one or more clickable action buttons.

16. The one or more non-transitory computer-readable storage media of claim 15, further comprising sequences of program instructions which, when executed using the one or more processors, cause the one or more processors to execute the corrective action by modifying the web page in the computer memory comprises causing displaying a notification that includes an explanation of why the one or more aspects was blocked.

17. The one or more non-transitory computer-readable storage media of claim 11, further sequences of program instructions which, when executed using the one or more processors, cause the one or more processors to execute the corrective action by modifying the web page in the computer memory comprises blocking loading one or more elements of the web page when the potential security risk is greater than a threshold.

18. The one or more non-transitory computer-readable storage media of claim 11, wherein the one or more aspects include one or more of links across the web page including references and names; specific element classes; a height of the web page; a size of the web page; a number of links; a number of images; type of fields in the web page such as password fields, email fields, text fields, or telephone fields; type of action buttons; metadata tags; or scripts to which the web page refers, including references and names.

19. The one or more non-transitory computer-readable storage media of claim 11, further comprising sequences of program instructions which, when executed using the one or more processors, cause the one or more processors to execute the corrective action by modifying the web page in the computer memory comprises one or more of:

removing one or more input fields of the web page that specify entering personally identifiable data;

disabling one or more input fields of the web page that specify entering personally identifiable data;

pausing one or more file upload operations;

pausing one or more file download operations;

disabling one or more file upload operations; or disabling one or more file download operations.

20. The one or more non-transitory computer-readable storage media of claim 11, further comprising sequences of program instructions which, when executed using the one or more processors, cause the one or more processors to execute the corrective action by modifying the web page in the computer memory and restricting a user from visiting or interacting with the web page, or blocking the user from visiting or interacting with the web page.

\* \* \* \* \*